US012337595B2

(12) United States Patent
Martin et al.

(10) Patent No.: US 12,337,595 B2
(45) Date of Patent: Jun. 24, 2025

(54) FLUIDIC DIES INCLUDING DISCHARGE CIRCUITS

(71) Applicant: Hewlett-Packard Development Company, L.P., Spring, TX (US)

(72) Inventors: Eric Thomas Martin, Corvallis, OR (US); Pere Esterri Pedra, Sant Cugat del Valles (ES); Daryl Eugene Anderson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 277 days.

(21) Appl. No.: 18/027,613

(22) PCT Filed: Sep. 25, 2020

(86) PCT No.: PCT/US2020/052730

§ 371 (c)(1),
(2) Date: Mar. 21, 2023

(87) PCT Pub. No.: WO2022/066166

PCT Pub. Date: Mar. 31, 2022

(65) Prior Publication Data

US 2023/0373207 A1 Nov. 23, 2023

(51) Int. Cl.
*B41J 2/045* (2006.01)

(52) U.S. Cl.
CPC ......... *B41J 2/04548* (2013.01); *B41J 2/0451* (2013.01); *B41J 2/04541* (2013.01); *B41J 2/0455* (2013.01); *B41J 2/04551* (2013.01); *B41J 2/0458* (2013.01)

(58) Field of Classification Search
CPC .. B41J 2/04548; B41J 2/0451; B41J 2/04541; B41J 2/0455; B41J 2/04551; B41J 2/0458
See application file for complete search history.

(56) References Cited

U.S. PATENT DOCUMENTS

| | | | | |
|---|---|---|---|---|
| 5,951,175 | A | 9/1999 | Kawamori | |
| 7,690,742 | B2 | 4/2010 | Han | |
| 8,262,180 | B2 | 9/2012 | Oshima et al. | |
| 8,511,796 | B2 * | 8/2013 | Ghozeil | B41J 2/04543 347/62 |
| 9,090,060 | B2 | 7/2015 | Cleare | |
| 9,868,282 | B2 | 1/2018 | Ishikawa et al. | |
| 2022/0250388 | A1 | 8/2022 | Okushima et al. | |

FOREIGN PATENT DOCUMENTS

| | | | |
|---|---|---|---|
| KR | 10-2017-0083502 | A | 7/2017 |
| WO | 2009/099439 | A1 | 8/2009 |
| WO | 2015/167483 | A1 | 11/2015 |
| WO | 2016/175740 | A1 | 11/2016 |
| WO | 2019/013788 | A1 | 1/2019 |

* cited by examiner

*Primary Examiner* — Geoffrey S Mruk
(74) *Attorney, Agent, or Firm* — Foley & Lardner LLP

(57) ABSTRACT

One example of a fluidic die includes a power supply node, a plurality of fluidic actuators, a plurality of discharge circuits, and a single discharge enable signal path. The plurality of fluidic actuators are electrically coupled to the power supply node. The plurality of discharge circuits are electrically coupled to the power supply node. The single discharge enable signal path is electrically coupled to each discharge circuit of the plurality of discharge circuits to enable each discharge circuit of the plurality of discharge circuits in parallel.

15 Claims, 8 Drawing Sheets

FLUIDIC DIES INCLUDING DISCHARGE CIRCUITS

CROSS-REFERENCE TO RELATED APPLICATIONS

This application is filed under 35 U.S.C. § 371 as a National Stage of PCT International Application No. PCT/US2020/052730, filed Sep. 25, 2020, which is incorporated by reference herein in its entirety.

BACKGROUND

An inkjet printing system, as one example of a fluid ejection system, may include a printhead, a fluid supply which supplies printing fluid to the printhead, and an electronic controller which controls the printhead. The printhead, which may include a fluidic die having fluidic actuators (e.g., ejecting actuators or non-ejecting actuators, such as micro-fluidic pumps to move fluid in microfluidic channels), may eject drops of fluid through a plurality of nozzles or orifices and toward a print medium, such as a sheet of paper, so as to print onto the print medium. In some examples, the orifices are arranged in a single column or array or multiple columns or arrays such that properly sequenced ejection of fluid from the orifices causes characters or other images to be printed upon the print medium as the printhead and the print medium are moved relative to each other.

DETAILED DESCRIPTION

Figure 1A:
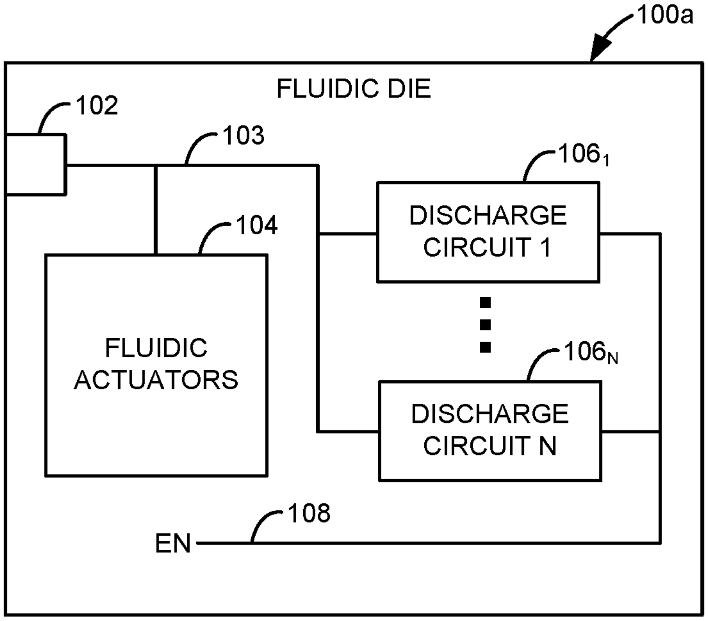
FIG. 1A is a block diagram illustrating one example of a fluidic die.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Continuing with the example of a printing system, a high voltage (e.g., 32V) power supply (e.g., VPP) may provide power to firing circuits on the printhead. While direct current (DC) loads on the power supply may be lower (e.g., 3 A), short-term transient loads may be significantly higher (e.g., 10 A for 1 μs). To accommodate such peak power demands, a single bulk capacitor or multiple bulk capacitors may be included in printhead electronics, such as on a printhead printed circuit assembly (PCA). The charge on the bulk capacitors should be discharged quickly when the bulk capacitors are not being used. For example, during a system initialization process including printhead alignment, the printheads may be turned on and off many times. If the bulk capacitors are not quickly discharged when the printheads are turned off, the printhead alignment process could take up to 15 minutes or more instead of about 5 minutes. The bulk capacitors should also be discharged either between pages or between print jobs, or during other system initialization processes, such as printhead servicing. If these processes take longer, then first page out and throughput, which are customer satisfaction specifications, suffer. In addition, when a fault occurs, high voltage nodes should be discharged as fast as possible.

Accordingly, disclosed herein are fluidic dies including a single high voltage (e.g., VPP) discharge block including multiple discharge circuits driven in parallel to discharge bulk capacitors charged by a high voltage (e.g., VPP) power supply. The discharge circuits may be arranged in a single location on the fluidic die or distributed among different locations on the fluidic die, such as at the corners of the fluidic die. The discharge circuits may be in a high side switch (HSS) or a low side switch (LSS) configuration. The fluidic die may include fault monitoring to autonomously enable the discharge block in response to detecting a fault. The systems and methods disclosed herein enable the bulk capacitors to be discharged without any extra discrete electronics on the printhead PCA (e.g., for improved cost) and without complicated firing and/or warming algorithms to discharge the bulk capacitors. In addition, the discharge circuits may be designed to be configurable to select the discharge rate, balancing the discharge time with other effects, such as parasitic heating rates.

FIG. 1A is a block diagram illustrating one example of a fluidic die 100*a*. Fluidic die 100*a* includes a power supply node 102 (e.g., a bond pad), a plurality of fluidic actuators 104, a plurality of discharge circuits $\mathbf{106}_1$ to $\mathbf{106}_N$, and a single discharge enable signal path 108, where "N" is any suitable number of discharge circuits (e.g., 4). The plurality of fluidic actuators 104 and the plurality of discharge circuits $\mathbf{106}_1$ to $\mathbf{106}_N$ are electrically coupled to the power supply node 102 through a signal path 103. The single discharge enable signal path 108 is electrically coupled to each discharge circuit $\mathbf{106}_1$ to $\mathbf{106}_N$ to enable each discharge circuit $\mathbf{106}_1$ to $\mathbf{106}_N$ in parallel via an enable (EN) signal.

Power supply node 102 receives power from a high voltage (e.g., 32V) power supply to power fluidic actuators 104 and/or other circuits (not shown) on the fluidic die 100*a*. The power supply node 102 may be electrically coupled to a bulk capacitor(s) (not shown) off fluidic die 100*a* to accommodate peak power demands of fluidic die 100*a*. In some examples, a printhead may include multiple fluidic dies and the bulk capacitor(s) may be electrically coupled to each of the fluidic dies. When fluidic actuators 104 and other high voltage circuits of fluidic die 100*a* are inactive, discharge circuits $106_1$ to $106_N$ are enabled in parallel by the enable (EN) signal on the single discharge enable signal path 108 to quickly discharge the charge on the bulk capacitor(s) electrically coupled to the power supply node 102. In one example, the enable signal is a logic low (e.g., 0V) to disable the discharge circuits $106_1$ to $106_N$ and logic high (e.g., 3V) to enable the discharge circuits $106_1$ to $106_N$. As will be described in more detail below with reference to FIG. 4B, the enable signal may be provided in response to a command from a fluidic system controller. This discharge control due to a command from a controller may be referred to as manual discharge control.

Figure 1B:
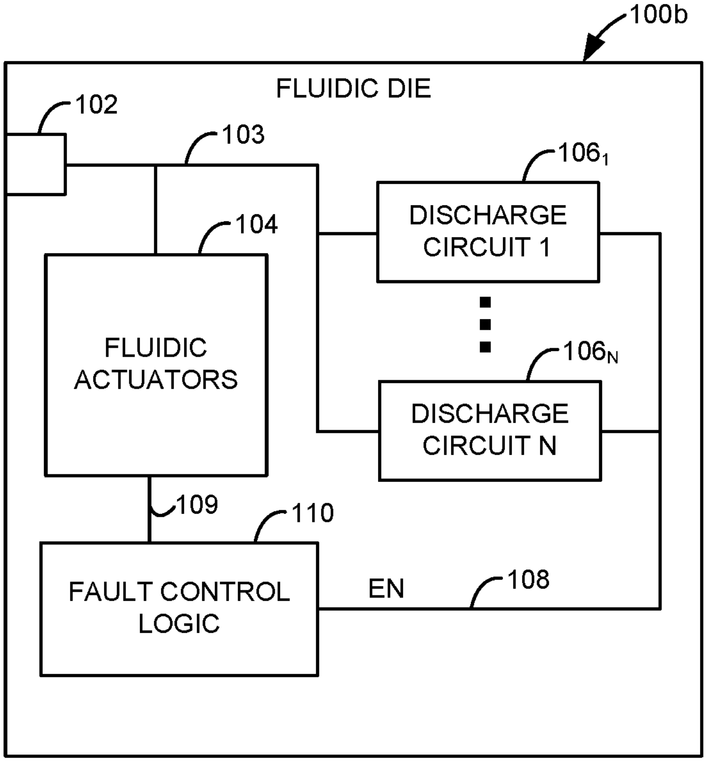
FIG. 1B is a block diagram illustrating another example of a fluidic die.

FIG. 1B is a block diagram illustrating another example of a fluidic die 100*b*. Fluidic die 100*b* is similar to fluidic die 100*a* previously described and illustrated with reference to FIG. 1A, except that fluidic die 100*b* also includes fault control logic 110. Fault control logic 110 is electrically coupled to fluidic actuators 104 through a signal path 109 and to each discharge circuit $106_1$ to $106_N$ through the single discharge enable signal path 108. The fault control logic 110 may apply an enable signal to the single discharge enable signal path 108 in response to detecting a fault.

In one example, fault control logic 110 monitors fluidic actuators 104 and/or other circuits (not shown) on fluidic die 100*b* to detect faults, such as thermal faults, data integrity faults, mechanical faults, power faults, clock watchdog faults, etc. To detect these types of faults, fault control logic 110 may be connected to other circuits (not shown) on the fluidic die 100*b* (e.g., thermal sense circuits, data parser circuits, clock watchdog circuits, mechanical strain gauges, etc.). In response to detecting a fault, fault control logic 110 may cease all on-die firing of fluidic actuators 104 and immediately apply the enable signal to single discharge enable signal path 108 to enable discharge circuits $106_1$ to $106_N$ in parallel to quickly discharge the charge on the bulk capacitor(s) electrically coupled to the power supply node 102. This discharge control due to detecting a fault may be referred to as autonomous discharge control.

Figure 2A:
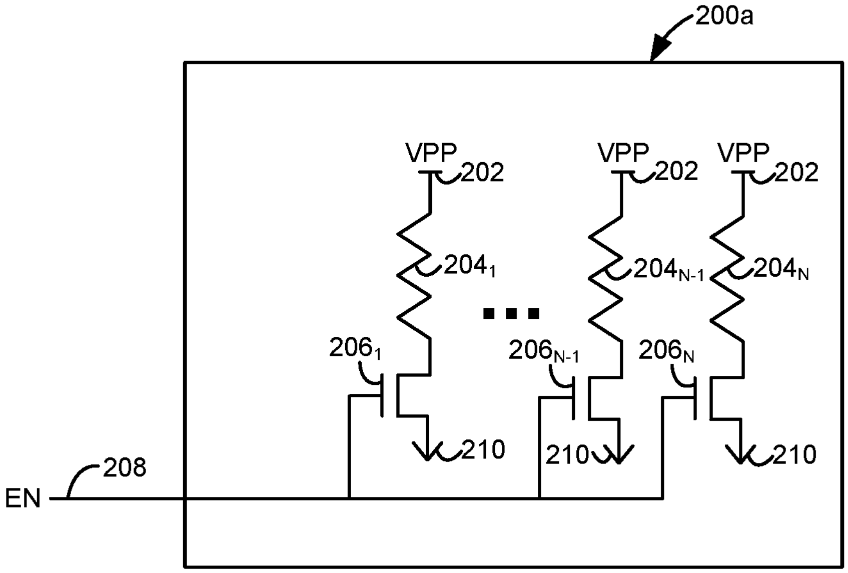
FIG. 2A is a schematic diagram illustrating one example of a discharge block.

FIG. 2A is a schematic diagram illustrating one example of a discharge block 200*a*. In one example, discharge block 200*a* may provide the plurality of discharge circuits $106_1$ to $106_N$ previously described and illustrated with reference to FIGS. 1A-1B. Discharge block 200*a* includes a power supply (e.g., VPP) node 202, a plurality of resistors $204_1$ to $204_N$, a plurality of low side switches (e.g., transistors) $206_1$ to $206_N$, a common or ground node 210, and a single discharge enable signal path 208. In one example, power supply node 202 provides power supply node 102 and single discharge enable signal path 208 provides single discharge enable signal path 108 previously described and illustrated with reference to FIGS. 1A-1B.

One side of each resistor $204_1$ to $204_N$ is electrically coupled to a power supply node 202. The other side of each resistor $204_1$ to $204_N$ is electrically coupled to one side of the source-drain path of a low side switch $206_1$ to $206_N$, respectively. The other side of the source-drain path of each low side switch $206_1$ to $206_N$ is electrically coupled to a common or ground node 210. The control input (e.g., gate) of each low side switch $206_1$ to $206_N$ is electrically coupled to the single discharge enable signal path 208. In one example, each resistor $204_1$ to $204_N$ and corresponding low side switch $206_1$ to $206_N$ form a corresponding discharge circuit, such as discharge circuits $106_1$ to $106_N$, respectively, as previously described and illustrated with reference to FIGS. 1A-1B. In response to a logic low enable (EN) signal on single discharge enable signal path 208, each low side switch $206_1$ to $206_N$ is turned off to disable each discharge circuit. In response to a logic high enable signal on single discharge enable signal path 208, each discharge circuit is turned on to discharge the charge on power supply node 202 through resistors $204_1$ to $204_N$ to common or ground node 210.

Figure 2B:
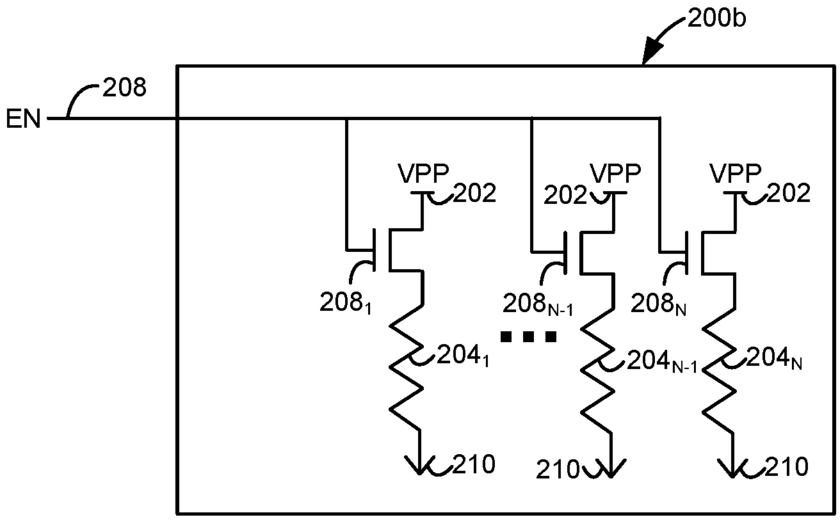
FIG. 2B is a schematic diagram illustrating another example of a discharge block.

FIG. 2B is a schematic diagram illustrating another example of a discharge block 200*b*. In one example, discharge block 200*b* may provide the plurality of discharge circuits $106_1$ to $106_N$ previously described and illustrated with reference to FIGS. 1A-1B. Discharge block 200*b* includes a power supply (e.g., VPP) node 202, a plurality of resistors $204_1$ to $204_N$, a plurality of high side switches (e.g., transistors) $208_1$ to $208_N$, a common or ground node 210, and a single discharge enable signal path 208. In one example, power supply node 202 provides power supply node 102 and single discharge enable signal path 208 provides single discharge enable signal path 108 previously described and illustrated with reference to FIGS. 1A-1B.

One side of each resistor $204_1$ to $204_N$ is electrically coupled to a common or ground node 210. The other side of each resistor $204_1$ to $204_N$ is electrically coupled to one side of the source-drain path of a high side switch $208_1$ to $208_N$, respectively. The other side of the source-drain path of each high side switch $208_1$ to $208_N$ is electrically coupled to a power supply node 202. The control input (e.g., gate) of each high side switch $208_1$ to $208_N$ is electrically coupled to the single discharge enable signal path 208. In one example, each resistor $204_1$ to $204_N$ and corresponding high side switch $208_1$ to $208_N$ form a corresponding discharge circuit, such as discharge circuits $106_1$ to $106_N$, respectively, as previously described and illustrated with reference to FIGS. 1A-1B. In response to a logic low enable (EN) signal on single discharge enable signal path 208, each high side switch $208_1$ to $208_N$ is turned off to disable each discharge circuit. In response to a logic high enable signal on single discharge enable signal path 208, each discharge circuit is turned on to discharge the charge on power supply node 202 through resistors $204_1$ to $204_N$ to common or ground node 210.

Figure 3A:
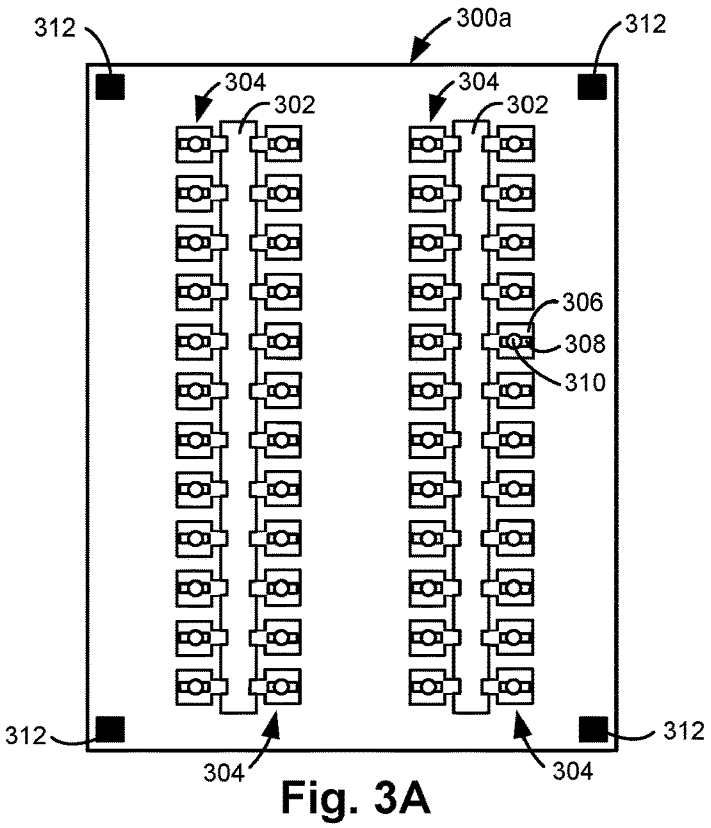
FIG. 3A is a schematic diagram illustrating one example of a fluidic die.

FIG. 3A is a schematic diagram illustrating one example of a fluidic die 300*a*. Fluidic die 300*a* includes fluid (e.g., ink) feed slots 302 and a plurality of fluidic actuators 304 arranged in columns on each side of each fluid feed slot 302. Each fluidic actuator 304 may include a chamber 306, a resistor 308, and a nozzle 310. The chamber 306 of each fluidic actuator 304 is fluidly connected to a fluid feed slot 302. Power may be applied to the resistor 308 of each fluidic actuator 304 to selectively nucleate a drop of fluid to eject the fluid through the corresponding nozzle 310 or to warm the fluid within the corresponding chamber 306. Fluidic die 300*a* also includes a plurality of discharge circuits 312, such as discharge circuits $106_1$ to $106_N$ previously described and illustrated with reference to FIGS. 1A-1B.

In this example, a portion of the plurality of discharge circuits 312 (e.g., a single discharge circuit or multiple discharge circuits) are arranged in each corner of the fluidic die 300*a*. In other examples, the plurality of discharge circuits 312 may be arranged in a single location on the fluidic die 300*a*, such as at the top or bottom of the fluidic die. Notably, in each example, the plurality of discharge circuits 312 are not arranged between the fluid feed slots 302. In other examples, the plurality of discharge circuits 312 may be placed in regions of the fluidic die 300*a* that are otherwise underutilized, have maximal heat sinking, and/or have minimal thermal conductivity to fluidics. Distributing the discharge circuits 312 over the fluidic die 300*a* may minimize local temperature rise.

Figure 3B:
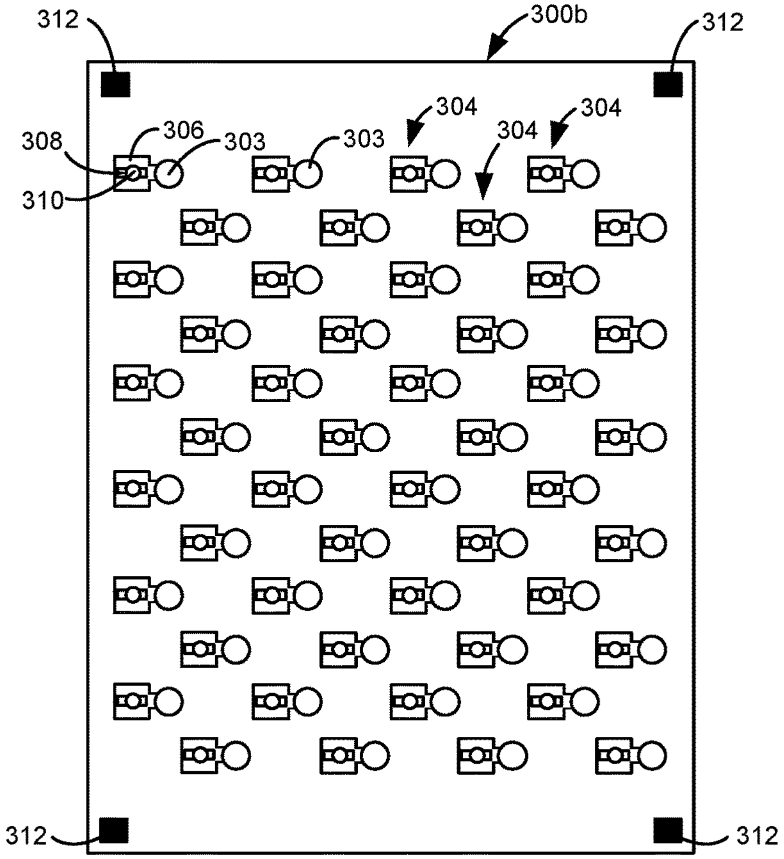
FIG. 3B is a schematic diagram illustrating another example of a fluidic die.

FIG. 3B is a schematic diagram illustrating another example of a fluidic die 300*b*. Fluidic die 300*b* includes a plurality of fluid (e.g., ink) feed holes 303 and a plurality of fluidic actuators 304 arranged in a sparse array. Each fluidic actuator 304 may include a chamber 306, a resistor 308, and a nozzle 310. The chamber 306 of each fluidic actuator 304 is fluidly connected to a fluid feed hole 303. Power may be applied to the resistor 308 of each fluidic actuator 304 to selectively nucleate a drop of fluid to eject the fluid through the corresponding nozzle 310 or to warm the fluid within the corresponding chamber 306. Fluidic die 300*b* also includes a plurality of discharge circuits 312, such as discharge circuits $\mathbf{106}_1$ to $\mathbf{106}_N$ previously described and illustrated with reference to FIGS. 1A-1B.

In this example, a portion of the plurality of discharge circuit 312 (e.g., a single discharge circuit or multiple discharge circuits) are arranged in each corner of the fluidic die 300*b*. In other examples, the plurality of discharge circuits 312 may be arranged in a single location on the fluidic die 300*b*, such as at the top or bottom of the fluidic die. Notably, in each example, the plurality of discharge circuits 312 are not arranged between the fluid feed holes 303. In other examples, the plurality of discharge circuits 312 may be placed in regions of the fluidic die 300*b* that are otherwise underutilized, have maximal heat sinking, and/or have minimal thermal conductivity to fluidics. Distributing the discharge circuits 312 over the fluidic die 300*b* may minimize local temperature rise.

Figure 4A:
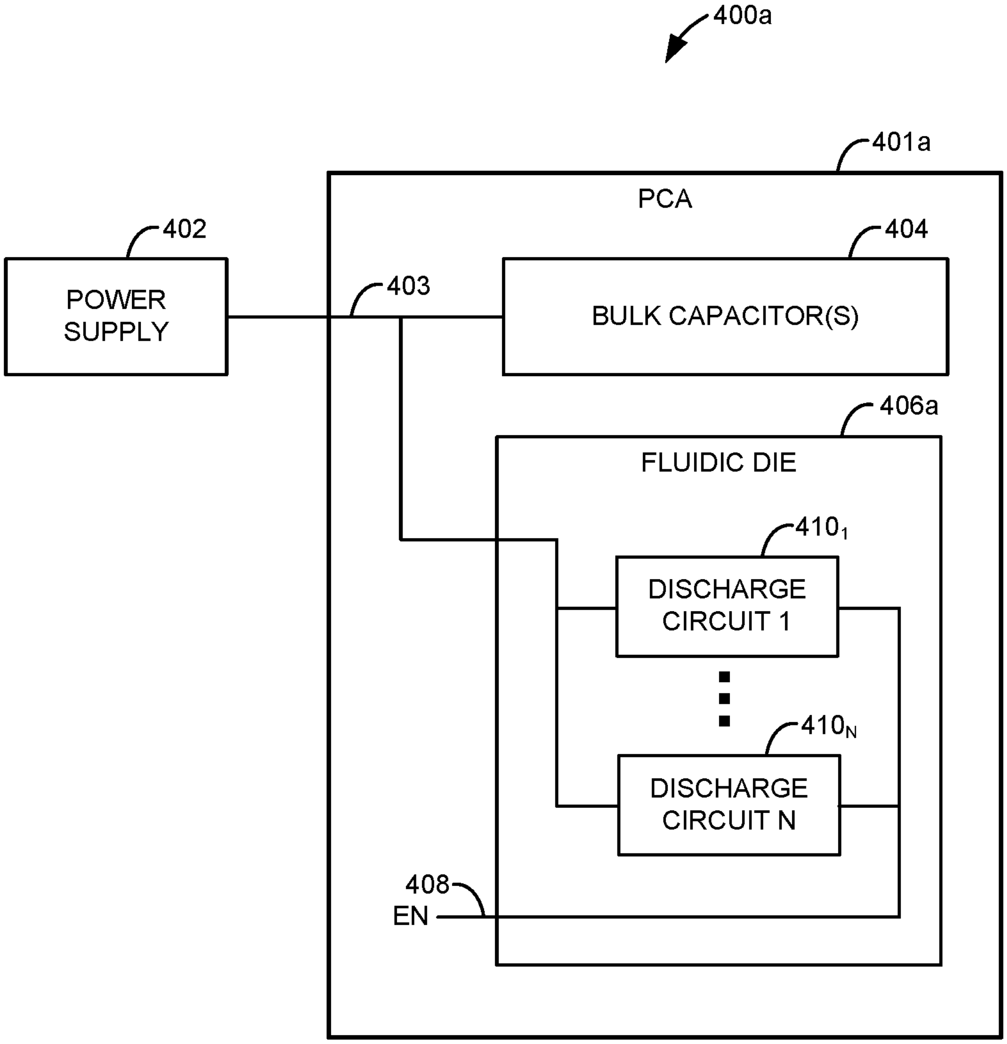
FIG. 4A is a block diagram illustrating one example of a fluidic system.

FIG. 4A is a block diagram illustrating one example of a fluidic system 400*a*. Fluidic system 400*a* includes a power supply 402, a bulk capacitor(s) 404, and a fluidic die 406*a*. In one example, the power supply 402 is a high voltage (e.g., 32V) power supply (e.g., VPP) used to power fluidic die 406*a*. The bulk capacitor(s) 404 and the fluidic die 406*a* may be arranged on a PCA 401*a*. In other examples, fluidic system 400*a* may include multiple fluidic dies arranged on the PCA 401*a*. The bulk capacitor(s) 404 and the fluidic die 406*a* are electrically coupled to the power supply 402 through a power supply node 403. When power supply 402 is turned on, bulk capacitor(s) 404 is charged by power supply 402 to accommodate peak power demands of the fluidic die 406*a*. The fluidic die 406*a* includes a plurality of discharge circuits $\mathbf{410}_1$ to $\mathbf{410}_N$ to be driven in parallel via a single discharge enable signal path 408 to selectively discharge the bulk capacitor(s) 404. The bulk capacitor(s) 404 may be discharged through discharge circuits $\mathbf{410}_1$ to $\mathbf{410}_N$ in response to an enable signal on single discharge enable signal path 408 each time the power supply 402 is turned off. In one example, discharge circuits $\mathbf{410}_1$ to $\mathbf{410}_N$ may be provided by discharge block 200*a* or 200*b* previously described and illustrated with reference to FIGS. 2A-2B.

Figure 4B:
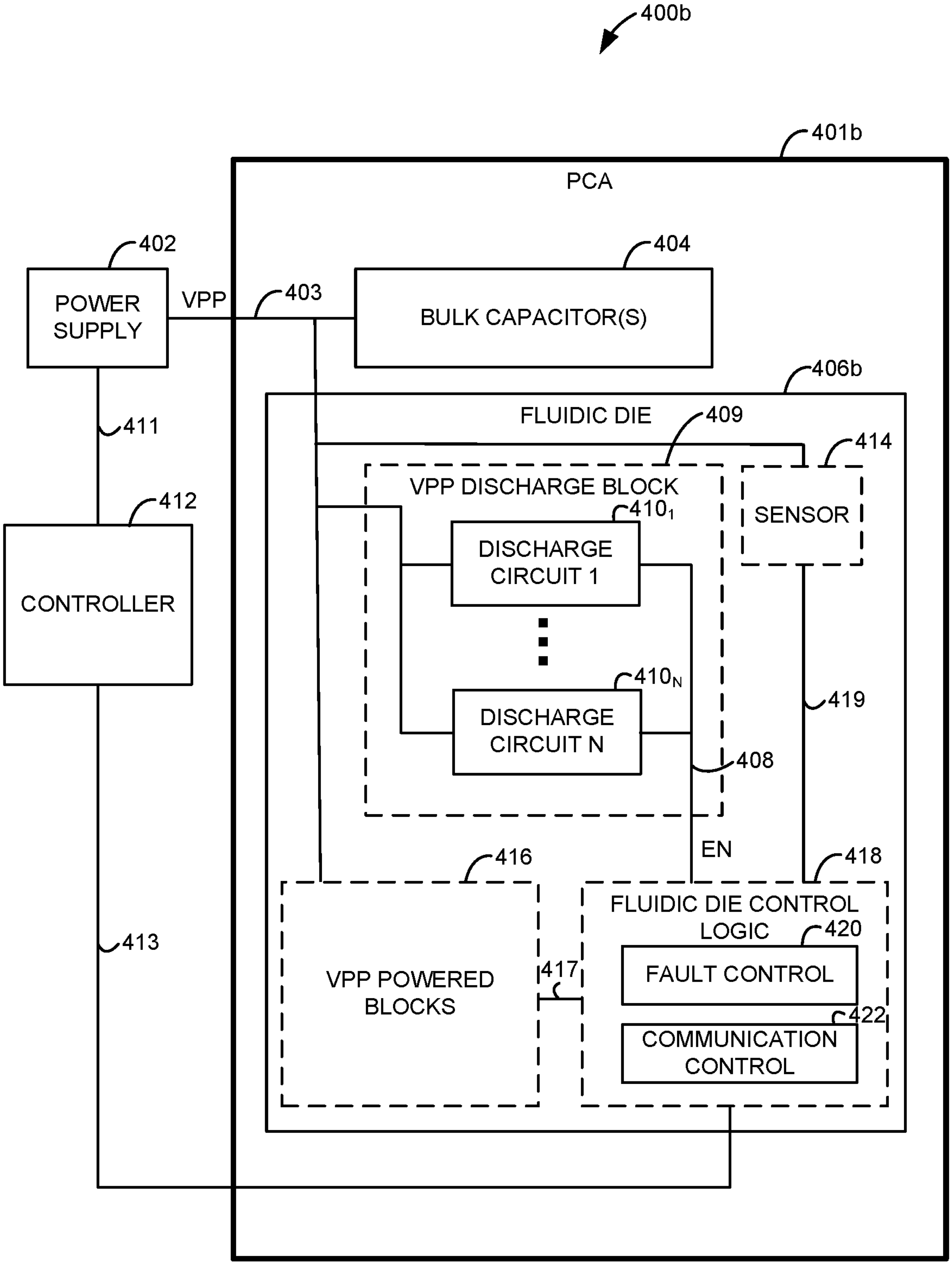
FIG. 4B is a block diagram illustrating another example of a fluidic system.

FIG. 4B is a block diagram illustrating another example of a fluidic system 400*b*. Fluidic system 400*b* includes a power supply 402, bulk capacitor(s) 404, and a fluidic die 406*b* including a VPP discharge block 409 including discharge circuits $\mathbf{410}_1$ to $\mathbf{410}_N$ as previously described and illustrated with reference to FIG. 4A. In addition, fluidic system 400*b* includes a controller 412 and the fluidic die 406*b* further includes a sensor 414, high voltage power supply (VPP) powered blocks 416, and fluidic die control logic 418. Fluidic die control logic 418 includes fault control logic 420 and communication control logic 422.

The power output of power supply 402 is electrically coupled to the bulk capacitor(s) 404, the sensor 414, the VPP discharge block 409, and the VPP powered blocks 416 through a power supply (VPP) node 403. A control input of power supply 402 is electrically coupled to controller 412 through a signal path 411. Controller 412 is electrically coupled to fluidic die control logic 418 through a communication path 413. Fluidic die control logic 418 is electrically coupled to the sensor 414 through a signal path 419, the VPP powered blocks 416 through a signal path 417, and to the discharge circuits $\mathbf{410}_1$ to $\mathbf{410}_N$ of VPP discharge block 409 through the single discharge enable signal path 408. VPP powered blocks 416 may include fluidic actuators, such as fluidic actuators 104 previously described and illustrated with reference to FIGS. 1A-1B, and/or other circuits, such as warming circuits, non-volatile memory, etc.

Controller 412 may enable (e.g., turn on) the power supply 402 when any VPP powered blocks 416 are active and disable (e.g., turn off) the power supply 402 when all VPP powered blocks 416 are inactive. The controller 412 may send a command to the fluidic die control logic 418 to enable the plurality of discharge circuits $\mathbf{410}_1$ to $\mathbf{410}_N$ in response to disabling the power supply 402. In response to receiving the command, fluidic die control logic 418 may apply an enable signal on single enable signal path 408 to enable the plurality of discharge circuits $\mathbf{410}_1$ to $\mathbf{410}_N$ in parallel.

Controller 412 may include a central processing unit (CPU), microprocessor, microcontroller, application-specific integrated circuit (ASIC), and/or other suitable logic circuitry for controlling the operation of power supply 402 and fluidic die 406*b*. Controller 412 may include a memory storing machine-readable instructions (e.g., firmware) executed by the controller for controlling the operation of the power supply 402 and the fluidic die 406*b*. Controller 412 may send commands to communication control logic 422 to control the operation of fluidic die 406*b* and may receive responses from communication control logic 422. The fault control logic 420 may enable the plurality of discharge circuits $\mathbf{410}_1$ to $\mathbf{410}_N$ and notify the controller 412 to disable the power supply 402 in response to detecting a fault, such as a thermal fault, a data integrity fault, a mechanical fault, a power fault, a clock watchdog fault, or another fault.

Sensor 414 may monitor the voltage on the bulk capacitor(s) 404 (by monitoring the voltage on power supply node 403) to determine whether the voltage is within a specified range. In this example, the fluidic die 406*b* includes the sensor 414. In other examples, however, the sensor 414 may be directly on PCA 401*b* or off PCA 401*b*. Sensor 414 may include an analog to digital converter, comparators, and/or other suitable circuitry to sense the voltage on power supply node 403. The sensor 414 or the fluidic die control logic 418 may determine whether the sensed voltage is within a specified range. The specified range may, for example, indicate whether the voltage on the power supply node 403 is sufficiently discharged (e.g., between 0V and 1V) or sufficiently charged (e.g., between 30V and 32V).

Figure 5A:
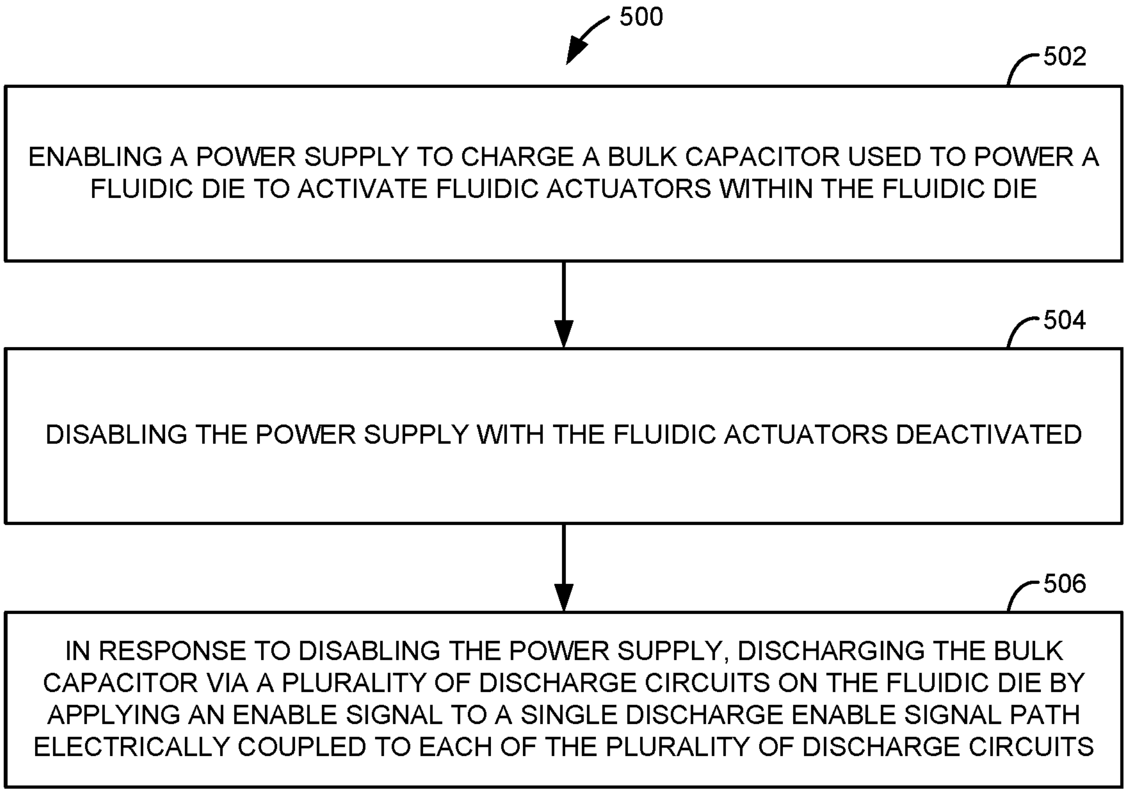
FIGS. 5A-5D are flow diagrams illustrating one example of a method for operating a fluidic system.

FIGS. 5A-5D are flow diagrams illustrating one example of a method 500 for operating a fluidic system, such as fluidic system 400*a* or 400*b* previously described and illustrated with reference to FIGS. 4A-4B. As illustrated in FIG. 5A at 502, method 500 includes enabling a power supply (e.g., 402) to charge a bulk capacitor (e.g., 404) used to power a fluidic die (e.g., 100*a*, 100*b*, 300*a*, 300*b*, 406*a*, or 406*b*) to activate fluidic actuators (e.g., 104, 304, or 416) within the fluidic die. At 504, method 500 includes disabling the power supply with the fluidic actuators deactivated. At 506, method 500 includes in response to disabling the power supply, discharging the bulk capacitor via a plurality of discharge circuits (e.g., $\mathbf{106}_1$ to $\mathbf{106}_N$ or $\mathbf{410}_1$ to $\mathbf{410}_N$) on the fluidic die by applying an enable signal (e.g., EN) to a single discharge enable signal path (e.g., 108, 208, or 408) electrically coupled to each of the plurality of discharge circuits.

Figure 5B:
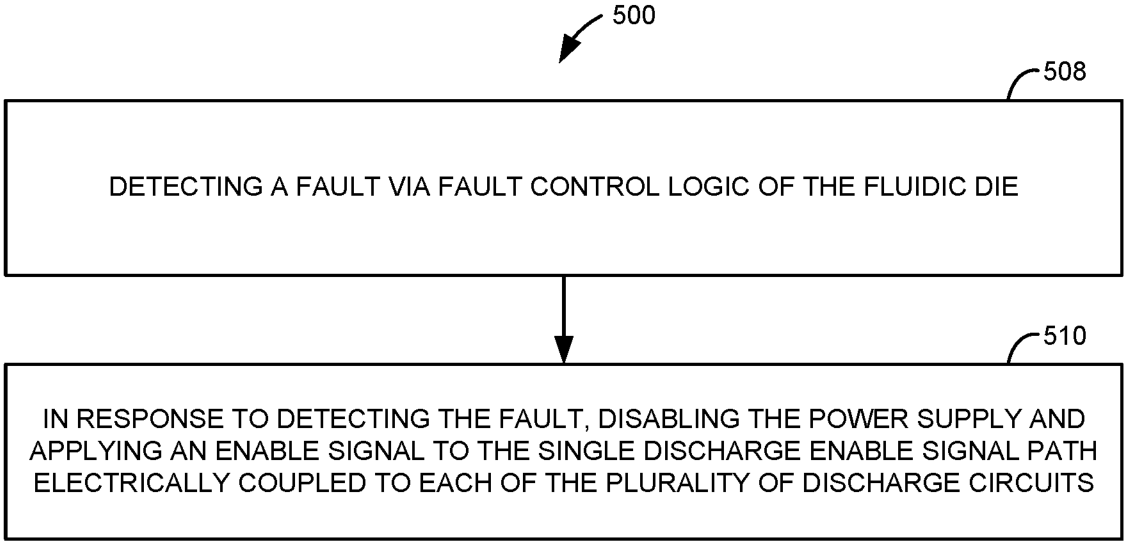

As illustrated in FIG. 5B at 508, method 500 may further include detecting a fault via fault control logic (e.g., 110 or 420) of the fluidic die. At 510, method 500 may further include in response to detecting the fault, disabling the power supply and applying an enable signal to the single discharge enable signal path electrically coupled to each of the plurality of discharge circuits.

Figure 5C:
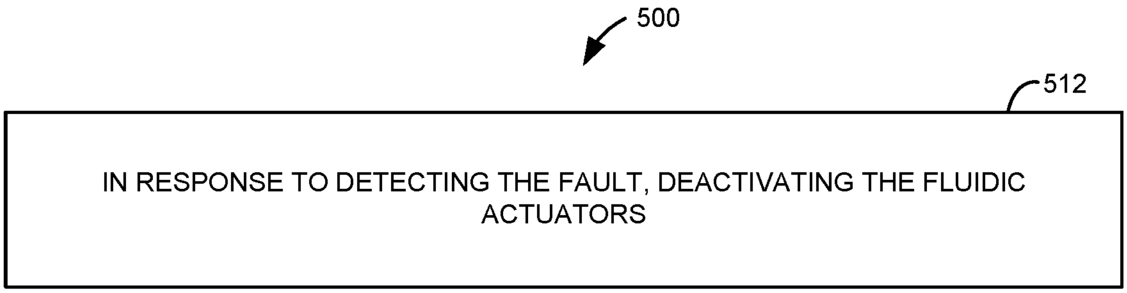
Figure 5D:
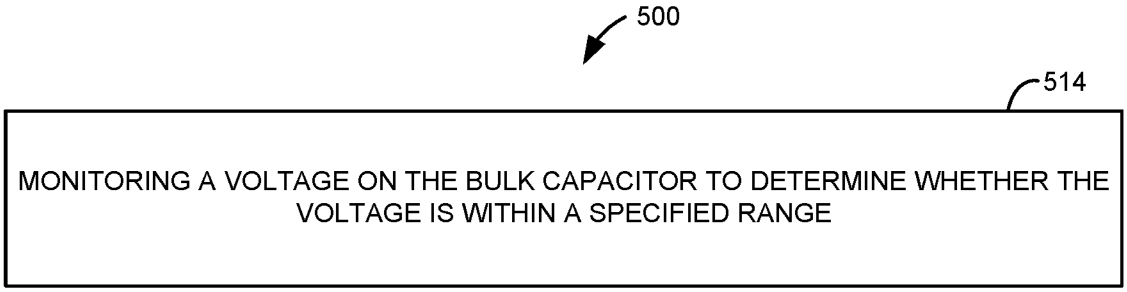

As illustrated in FIG. 5C at 512, method 500 may further include in response to detecting the fault, deactivating the fluidic actuators. As illustrated in FIG. 5D at 514, method 500 may further include monitoring (e.g., via sensor 414) a voltage on the bulk capacitor to determine whether the voltage is within a specified range.

Figure 6:
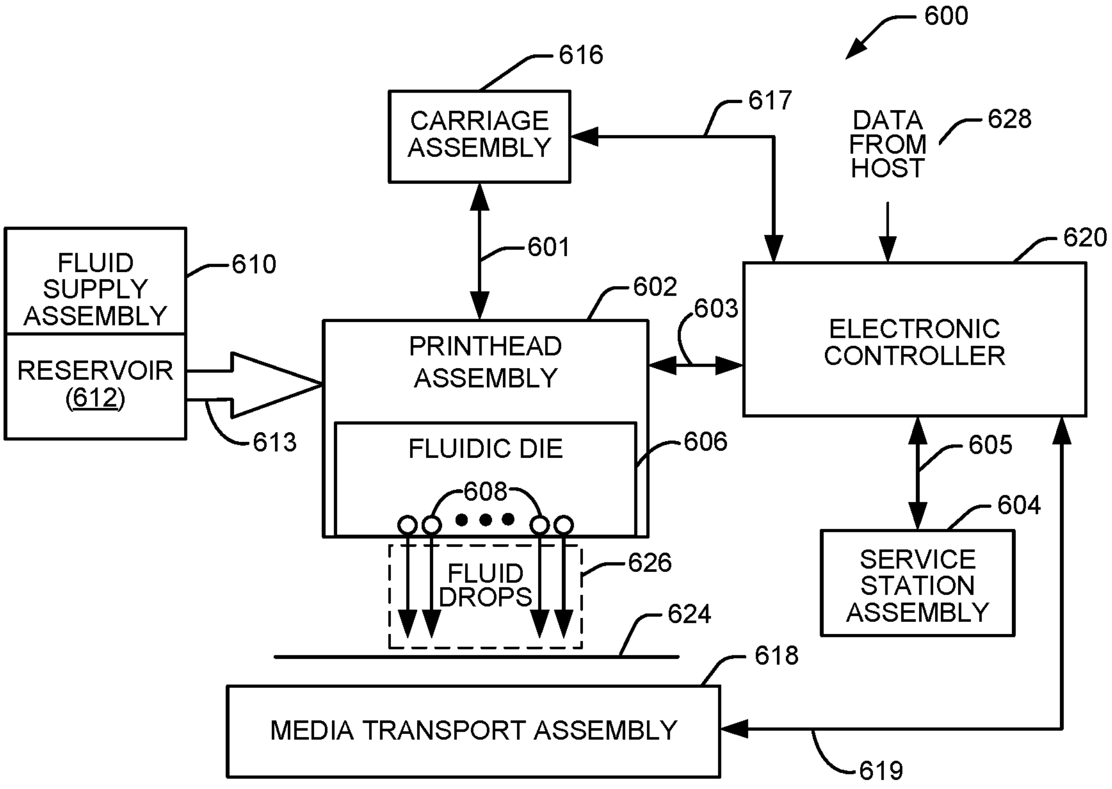
FIG. 6 is a block diagram illustrating one example of a fluid ejection system.

FIG. 6 is a block diagram illustrating one example of a fluid ejection system 600. Fluid ejection system 600 includes a fluid ejection assembly, such as printhead assembly 602, and a fluid supply assembly 610, such as an ink supply assembly. In the illustrated example, fluid ejection system 600 also includes a service station assembly 604, a carriage assembly 616, a print media transport assembly 618, and an electronic controller 620. While the following description provides examples of systems and assemblies for fluid handling with regard to ink, the disclosed systems and assemblies are also applicable to the handling of fluids other than ink.

Printhead assembly 602 includes a single printhead or fluidic die 606 or multiple printheads or fluidic die 606 including fluidic actuators (e.g., ejecting actuators or non-ejecting actuators, such as micro-fluidic pumps to move fluid in microfluidic channels) and discharge circuits (not shown) as previously described and illustrated with reference to FIGS. 1A-4B. The fluidic die 606 may eject drops of ink or fluid through a plurality of orifices or nozzles 608. In one example, the drops are directed toward a medium, such as print media 624, so as to print onto print media 624. In one example, print media 624 includes any type of suitable sheet material, such as paper, card stock, transparencies, Mylar, fabric, and the like. In another example, print media 624 includes media for three-dimensional (3D) printing, such as a powder bed, or media for bioprinting and/or drug discovery testing, such as a reservoir or container. In one example, nozzles 608 are arranged in a single column or array or multiple columns or arrays such that properly sequenced ejection of fluid from nozzles 608 causes characters, symbols, and/or other graphics or images to be printed upon print media 624 as printhead assembly 602 and print media 624 are moved relative to each other.

Fluid supply assembly 610 supplies fluid (e.g., ink) to printhead assembly 602 and includes a reservoir 612 for storing fluid. As such, in one example, fluid flows from reservoir 612 to printhead assembly 602. In one example, printhead assembly 602 and fluid supply assembly 610 are housed together in an inkjet or fluid-jet print cartridge or pen. In another example, fluid supply assembly 610 is separate from printhead assembly 602 and supplies fluid to printhead assembly 602 through an interface connection 613, such as a supply tube and/or valve.

Carriage assembly 616 positions printhead assembly 602 relative to print media transport assembly 618, and print media transport assembly 618 positions print media 624 relative to printhead assembly 602. Thus, a print zone 626 is defined adjacent to nozzles 608 in an area between printhead assembly 602 and print media 624. In one example, printhead assembly 602 is a scanning type printhead assembly such that carriage assembly 616 moves printhead assembly 602 relative to print media transport assembly 618. In another example, printhead assembly 602 is a non-scanning type printhead assembly such that carriage assembly 616 fixes printhead assembly 602 at a prescribed position relative to print media transport assembly 618.

Service station assembly 604 provides for spitting, wiping, capping, and/or priming of printhead assembly 602 to maintain the functionality of printhead assembly 602 and, more specifically, nozzles 608. For example, service station assembly 604 may include a rubber blade or wiper which is periodically passed over printhead assembly 602 to wipe and clean nozzles 608 of excess fluid. In addition, service station assembly 604 may include a cap that covers printhead assembly 602 to protect nozzles 608 from drying out during periods of non-use. In addition, service station assembly 604 may include a spittoon into which printhead assembly 602 ejects fluid during spits to ensure that reservoir 612 maintains an appropriate level of pressure and fluidity, and to ensure that nozzles 608 do not clog or weep. Functions of service station assembly 604 may include relative motion between service station assembly 604 and printhead assembly 602.

Electronic controller 620 communicates with printhead assembly 602 through a communication path 603, service station assembly 604 through a communication path 605, carriage assembly 616 through a communication path 617, and print media transport assembly 618 through a communication path 619. In one example, when printhead assembly 602 is mounted in carriage assembly 616, electronic controller 620 and printhead assembly 602 may communicate via carriage assembly 616 through a communication path 601. Electronic controller 620 may also communicate with fluid supply assembly 610 such that, in one implementation, a new (or used) fluid supply may be detected.

Electronic controller 620 receives data 628 from a host system, such as a computer, and may include memory for temporarily storing data 628. Data 628 may be sent to fluid ejection system 600 along an electronic, infrared, optical or other information transfer path. Data 628 represent, for example, a document and/or file to be printed. As such, data 628 form a print job for fluid ejection system 600 and includes a single print job command and/or command parameter or multiple print job commands and/or command parameters.

In one example, electronic controller 620 provides control of printhead assembly 602 including timing control for ejection of fluid drops from nozzles 608. As such, electronic controller 620 defines a pattern of ejected fluid drops which form characters, symbols, and/or other graphics or images on print media 624. Timing control and, therefore, the pattern of ejected fluid drops, is determined by the print job commands and/or command parameters. In one example, logic and drive circuitry forming a portion of electronic controller 620 is located on printhead assembly 602. In another example, logic and drive circuitry forming a portion of electronic controller 620 is located off printhead assembly 602.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluidic die comprising:

a power supply node;

a plurality of fluidic actuators electrically coupled to the power supply node;

a plurality of discharge circuits electrically coupled to the power supply node; and a single discharge enable signal path electrically coupled to each discharge circuit of the plurality of discharge circuits to enable each discharge circuit of the plurality of discharge circuits in parallel.

2. The fluidic die of claim 1, wherein a portion of the plurality of discharge circuits are arranged in each corner of the fluidic die.

3. The fluidic die of claim 1, wherein each discharge circuit of the plurality of discharge circuits comprises a high side switch electrically coupled to the single discharge enable signal path.

4. The fluidic die of claim 1, wherein each discharge circuit of the plurality of discharge circuits comprises a low side switch electrically coupled to the single discharge enable signal path.

5. The fluidic die of claim 1, further comprising:

fault control logic to apply an enable signal to the single discharge enable signal path in response to detecting a fault.

6. The fluidic die of claim 1, wherein the plurality of fluidic actuators are arranged in a sparse array.

7. A fluidic system comprising:

a power supply;

a bulk capacitor electrically coupled to the power supply; and a fluidic die electrically coupled to the power supply and the bulk capacitor, the fluidic die comprising a plurality of discharge circuits to be driven in parallel via a single discharge enable signal path to selectively discharge the bulk capacitor.

8. The fluidic system of claim 7, further comprising:

a controller to enable and disable the power supply, the controller to send a command to the fluidic die to enable the plurality of discharge circuits in response to disabling the power supply.

9. The fluidic system of claim 8, wherein the fluidic die comprises fault control logic to enable the plurality of discharge circuits and to notify the controller to disable the power supply in response to detecting a fault.

10. The fluidic system of claim 7, further comprising:

a sensor to monitor the voltage on the bulk capacitor to determine whether the voltage is within a specified range.

11. The fluidic system of claim 10, wherein the fluidic die comprises the sensor.

12. A method for operating a fluidic system, the method comprising:

enabling a power supply to charge a bulk capacitor used to power a fluidic die to activate fluidic actuators within the fluidic die;

disabling the power supply with the fluidic actuators deactivated; and in response to disabling the power supply, discharging the bulk capacitor via a plurality of discharge circuits on the fluidic die by applying an enable signal to a single discharge enable signal path electrically coupled to each of the plurality of discharge circuits.

13. The method of claim 12, further comprising:

detecting a fault via fault control logic of the fluidic die; and in response to detecting the fault, disabling the power supply and applying an enable signal to the single discharge enable signal path electrically coupled to each of the plurality of discharge circuits.

14. The method of claim 13, further comprising:

in response to detecting the fault, deactivating the fluidic actuators.

15. The method of claim 12, further comprising:

monitoring a voltage on the bulk capacitor to determine whether the voltage is within a specified range.

* * * * *